US012637018B2

(12) United States Patent
Jackson

(10) Patent No.: US 12,637,018 B2
(45) **Date of Patent: *May 26, 2026**

(54) QUICK RELEASE TOOL BAG SECURING SYSTEM

(71) Applicant: Jackson Design and Development, LLC, Phoenix, AZ (US)

(72) Inventor: Conor Jackson, Phoenix, AZ (US)

(73) Assignee: Jackson Design and Development, LLC, Phoenix, AZ (US)

( * ) Notice: Subject to any disclaimer, the term of this patent is extended or adjusted under 35 U.S.C. 154(b) by 65 days.

This patent is subject to a terminal disclaimer.

(21) Appl. No.: 18/329,323

(22) Filed: Jun. 5, 2023

(65) Prior Publication Data

US 2023/0406230 A1 Dec. 21, 2023

Related U.S. Application Data

(60) Provisional application No. 63/353,115, filed on Jun. 17, 2022.

(51) Int. Cl.
B60R 11/06 (2006.01)
B60R 11/00 (2006.01)

(52) U.S. Cl.
CPC ....... B60R 11/06 (2013.01); *B60R 2011/0078* (2013.01)

(58) Field of Classification Search
CPC .... B60R 11/06; B60R 2011/0078; B62J 7/04; F16M 11/041
USPC ................ 224/42.4, 413, 547, 629; 248/503, 248/220.21, 221.11, 222.21, 225.21
See application file for complete search history.

(56) References Cited

U.S. PATENT DOCUMENTS

| | | | | |
|---|---|---|---|---|
| 3,651,883 A | * | 3/1972 | Aldag | H01M 50/262 |
| | | | | 180/68.5 |
| 4,088,252 A | * | 5/1978 | Grunberger | A45F 3/042 |
| | | | | D3/217 |
| 4,266,703 A | | 5/1981 | Litz | |
| 4,325,531 A | | 4/1982 | Omholt | |
| 4,739,637 A | | 4/1988 | Finkel et al. | |
| 4,974,765 A | | 12/1990 | Marchetto et al. | |
| 5,178,312 A | * | 1/1993 | Iida | A45F 3/08 |
| | | | | 224/628 |
| 5,628,443 A | * | 5/1997 | Deutsch | A45F 3/00 |
| | | | | 190/110 |
| 5,732,867 A | | 3/1998 | Perkins et al. | |
| 7,703,645 B2 | * | 4/2010 | Moskun | A45F 3/08 |
| | | | | 224/579 |
| 7,806,308 B2 | | 10/2010 | Gunn | |
| 7,984,889 B2 | | 7/2011 | Whitley et al. | |
| 8,225,969 B2 | | 7/2012 | Quinn et al. | |

(Continued)

*Primary Examiner* — Justin M Larson
(74) *Attorney, Agent, or Firm* — Schmeiser, Olsen & Watts LLP

(57) ABSTRACT

A quick release securing system is disclosed. The system may include a first plate, a second plate, a third plate, and a quick-release assembly. The first plate is coupled to an inside surface of a container, such as a tool bag, and to a second plate on the outside surface of the tool bag with fastening means. The second plate is releasably secured to the third plate which is fixedly coupled to a support structure, such as a UTV or an ATV. The second plate and third plate are quickly and easily attachable and detachable from each other by user operating a quick-release assembly of the system.

6 Claims, 14 Drawing Sheets

(56)           References Cited

U.S. PATENT DOCUMENTS

| 9,861,178 B1 | 1/2018 | Vanman et al. |
| 9,949,557 B2 * | 4/2018 | Crimaldi .................. A45F 3/08 |
| 10,230,077 B2 * | 3/2019 | Rief .................. H01M 50/247 |
| 10,787,216 B2 | 9/2020 | Visenzi |
| 11,890,996 B2 * | 2/2024 | Jackson ................ B60R 11/06 |
| D1,060,902 S * | 2/2025 | Williams ...................... D3/216 |
| 2008/0073396 A1 | 3/2008 | Chiang et al. |

* cited by examiner

QUICK RELEASE TOOL BAG SECURING SYSTEM

CROSS REFERENCE TO RELATED APPLICATION[S]

This application claims priority to U.S. Provisional Patent Application entitled "QUICK RELEASE TOOL BAG SECURING SYSTEM," Ser. No. 63/353,115, filed Jun. 17, 2022, the disclosure of which is hereby incorporated entirely herein by reference.

BACKGROUND OF THE INVENTION

Technical Field

This invention relates to a system for a quick release securing system, particularly a quick release tool bag/case securing system.

State of the Art

Many riders of off-road vehicles, such as all-terrain vehicle (ATV) and utility terrain vehicle (UTV), carry tool bags, tool cases, coolers, first aid kits, etc. However, attaching such tool bags/cases to the off-road vehicle can be an issue. The tool bags/cases or containers are either permanently attached to the off-road vehicle or secured in a haphazard manner utilizing straps and other cobbled together devices to attach the tool bags/cases or containers to the vehicle.

Accordingly, what is needed is an improved securing system that attaches to an off-road vehicle that allows for quick release of a tool bag/case or other container.

DISCLOSURE OF THE INVENTION

The present invention relates to a quick release tool bag/case securing system and particularly to a quick release tool bag/case securing system for attaching a tool bag to an off-road vehicle, including, but not limited to an utility-terrain vehicle (UTV), an all-terrain vehicle (ATV), or the like.

Disclosed is a quick release securing system for a container comprising: a first plate received within an interior of the container to lie against an interior of a wall surface thereof; a second plate having a bent flange portion and secured to an exterior wall surface of the container, wherein the first plate and the second plate are secured together having the wall surface of the container therebetween; and a third plate having a J-shaped flange portion extending along an edge portion thereof, the bent flange portion of the second plate received within the J-shaped flange portion of the third plate, wherein the second and third plates are releasably secured together. The quick release securing system may further comprise a quick release assembly having a biased pin member, slideably mounted on the third plate and selectively engageable with the second plate in order to releasably secure the second and third plates together.

The quick release securing system may comprise a plurality of longitudinal slots arranged in a pattern on both the second and third plates in order to enable the second and third plates to be selectively mounted to a support structure (not shown). The third plate may be fixedly coupled to the support structure. The support structure may be an off-road vehicle. The third plate may be provided with a plurality of dimpled portions arranged in a pattern on the third plate. The plurality of dimpled portions may be arranged to extend outwardly from a rear surface of the third plate. The plurality of dimpled portions extending outwardly from the rear surface of the third plate towards the support structure. The second plate may be provided with a plurality of dimpled portions arranged in a pattern on the second plate, the pattern on the second plate corresponding to the pattern of the dimpled portions on the third plate. The plurality of dimpled portions may be arranged to extend outwardly from a rear surface of the second plate and away from the container to which the second plate is coupled. The bent flange portion of the second plate may extend along an edge portion thereof and wherein a tab flange portion extends along an opposite edge portion of the second plate. The tab flange portion may be provided with an aperture to receive a biased pin member provided on the third plate. The quick release securing system may comprise a padlock between the second and third plates. The container may be flexible. The container may be a tool bag. The container may be rigid. An outer face of the first plate may comprise a logo and/or indicia.

Disclosed is a method for selectively mounting a container to a support structure comprising: providing a first plate received within an interior of the container to lie against an interior wall surface thereof; providing a second plate having a bent flange portion and secured to an exterior wall surface of the container, wherein the first plate and the second plate are secured together having the wall surfaces of the container therebetween; providing a third plate fixedly coupled to the support structure and having a J-shaped flange portion extending along an edge portion thereof, the bent flange portion of the second plate received within the J-shaped flange portion of the third plate, wherein the second and third plates are releasably secured together; providing a quick release assembly having a biased pin member, slideably mounted on the third plate and selectively engageable with the second plate in order to releasably secure the second and third plates together; and selectively releasing the biased pin member, removing the second plate from the third plate. The method may further comprise after removing the second plate from the third plate, repositioning the second plate against the third plate. The method may further comprise withdrawing the pin against its bias in order to receive the second plate against the third plate. The support structure may be an off-road vehicle. The container may be a tool bag.

Further, disclosed is a method of using a quick release assembly, the method comprising: removing a pin block of a quick release assembly from a first component or first substrate, wherein the quick release assembly operated to secure an item to the first component or the first substrate; coupling the pin block to a second component or a second substrate; and releasably securing an item to the second component or the second substrate by operating the quick release assembly.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
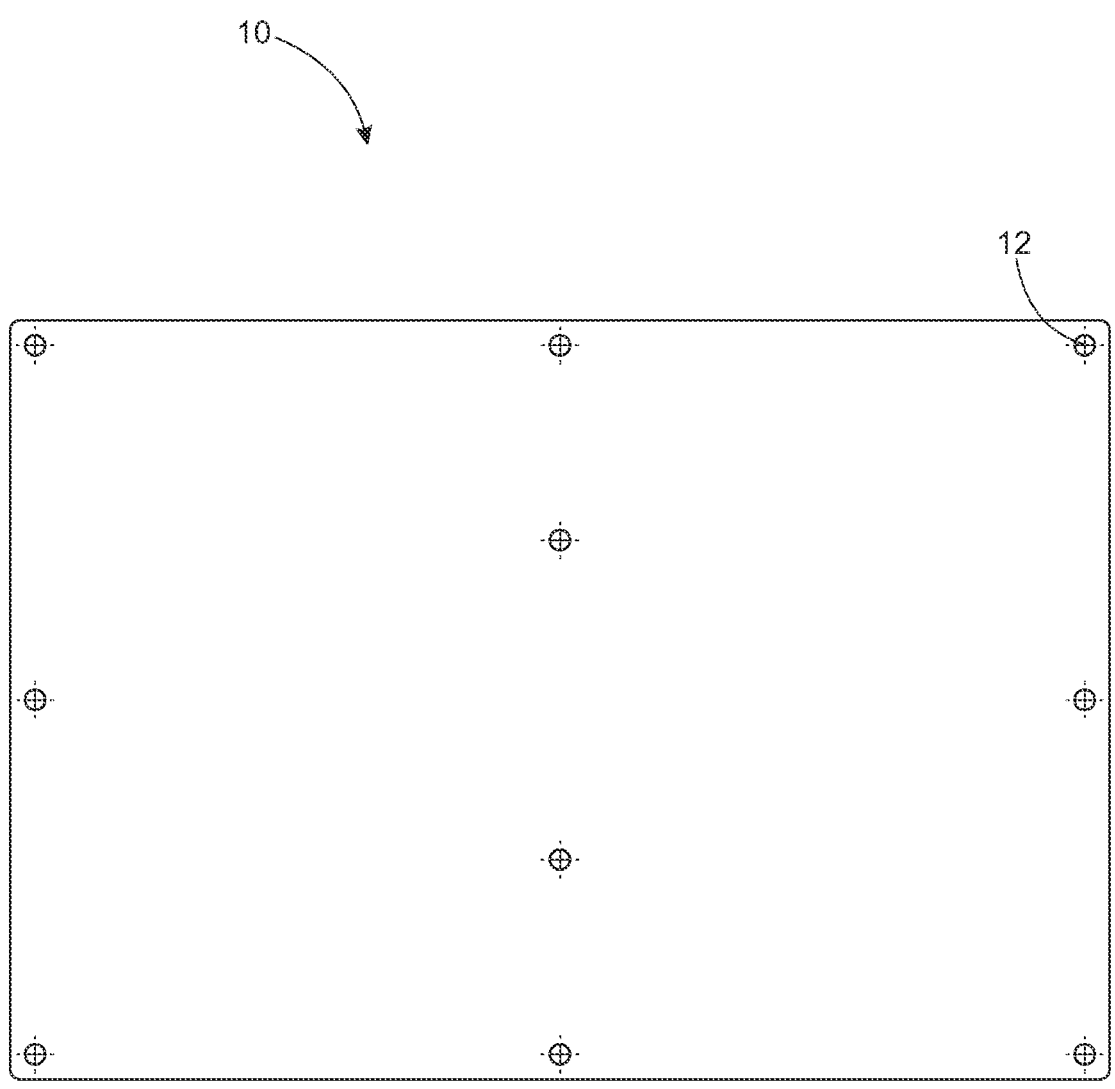
FIG. 1 shows a plan view of a first plate of a quick release tool bag/case securing system according to an embodiment of the invention.

As discussed above, embodiments of the present invention relate to a quick release securing system for securing a container, such as a tool kit, to a support structure that allows for a quick release of the tool kit or other container.

Referring to the drawings, FIGS. 1-10 depict an embodiment of a quick-release securing system 100 for use a container 10. The system 100 may include a first plate 10, a second plate 20, a third plate 30, and a quick release assembly 40. In some embodiments, the system 100 may also include a gasket 50.

Figure 2:
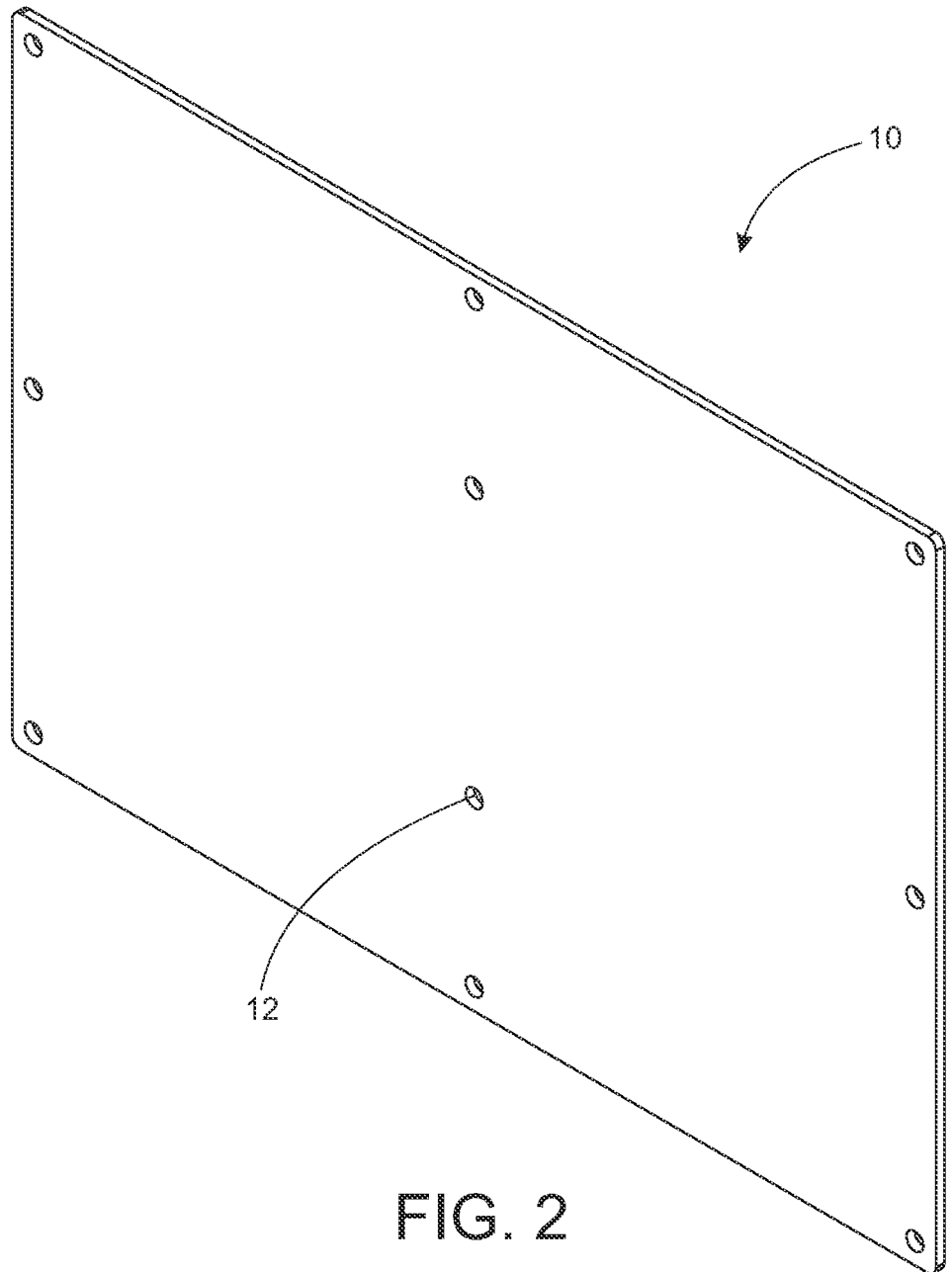
FIG. 2 shows a perspective view of a first plate of a quick release tool bag/case securing system according to an embodiment of the invention.

Referring to FIGS. 1 and 2, the first plate 10 may include a plurality of apertures 12. These apertures 12 are configured for receiving various hardware, such as bolts (not shown), for coupling first plate 10 to the second plate 20 with a wall surface of the container 50 between the first plate 10 and the second plate 20 (see FIG. 12).

Figure 3:
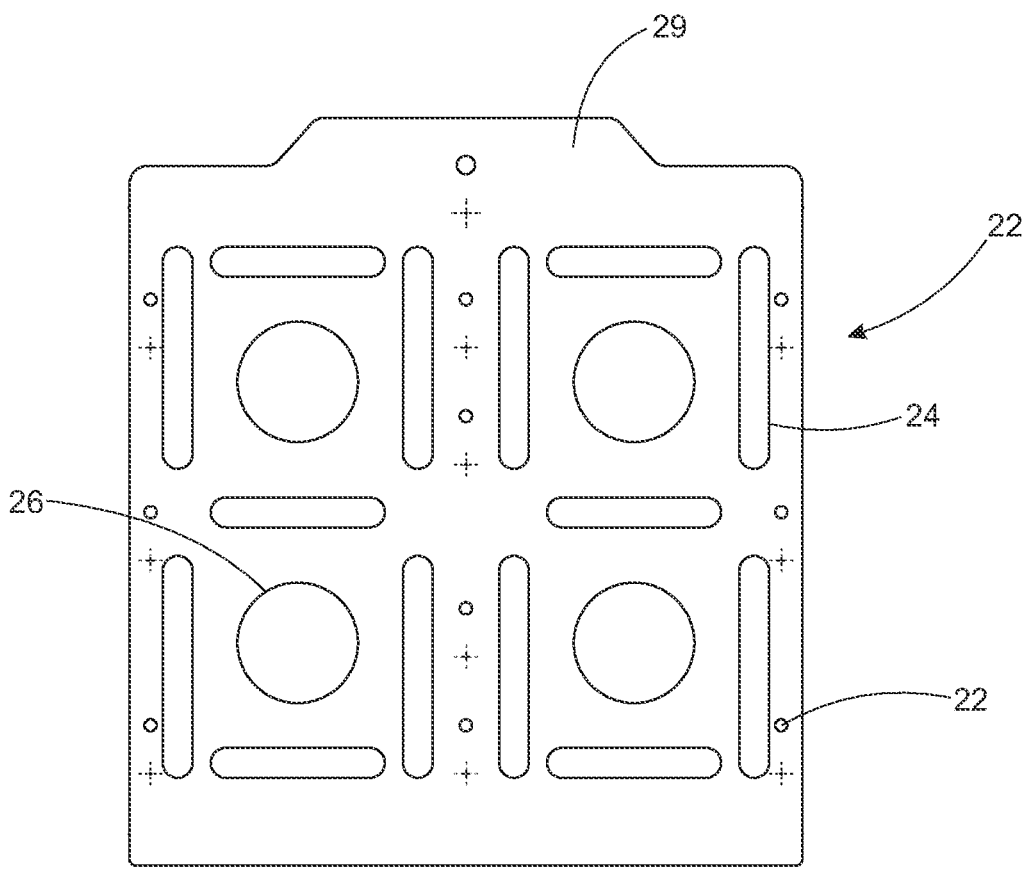
FIG. 3 shows a plan view of a second plate in its pre-formed state of a quick release tool bag/case securing system according to an embodiment of the invention.
Figures 4A, 4B:
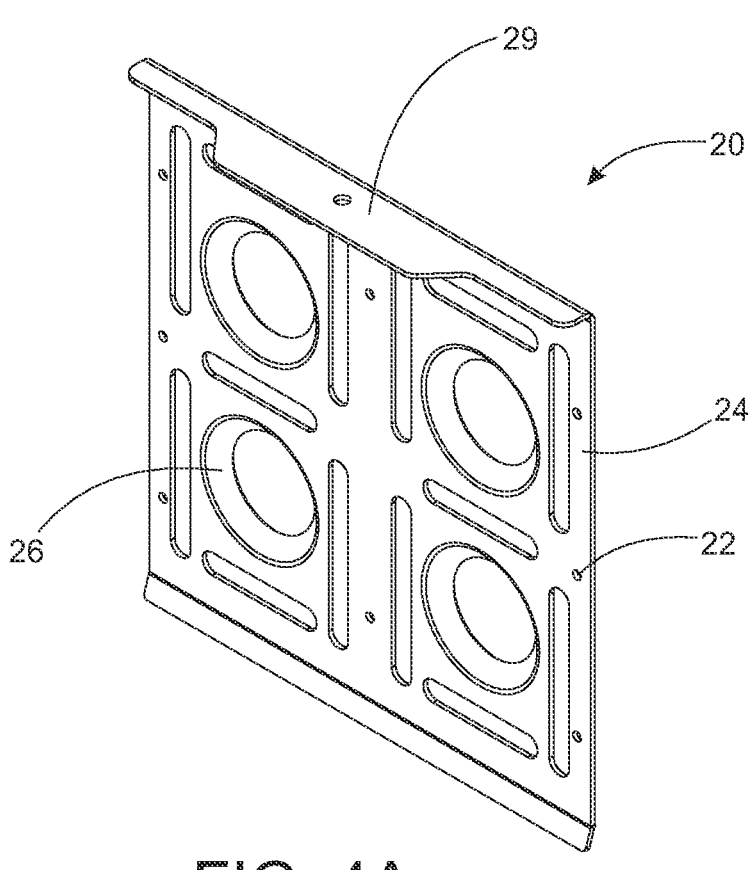
FIG. 4A shows a perspective view of a second plate in its formed state of a quick release tool bag/case securing system according to an embodiment of the invention.
FIG. 4B shows a side view of a second plate in its formed state of a quick release tool bag/case securing system according to an embodiment of the invention.

Referring to FIGS. 3-4B, depicted is the second plate 20 having a slightly bent flange portion 28 and tab flange portion 29. The second plate 20 may be secured to an exterior wall surface of the container 50. First plate 10 and second plate 20 are secured together having the wall surfaces of the container 50 therebetween (see FIG. 12). Bent flange portion 28 of second plate 20 extends along an edge portion thereof and tab flange portion 29 extends along an opposite edge portion of second plate 20. FIG. 34B also show second plate 20 having a plurality of apertures 22, longitudinal slots 24 and weight reducing holes 26, all in a pattern. The wall surface of the container 50 is "sandwiched" between first plate 10 and second plate 20. The plurality of apertures 22 correspond to the plurality of apertures 12 of the first plate 10 and operate to receive hardware to couple the first plate 10 with the second plate 20 and the wall surface of the container 50 coupled between the first plate 10 and the second plate 20. Further, the weight reducing holes 26 also operate as a plurality of dimpled portions 26 arranged in a pattern on the second plate 20. The plurality of dimpled portions 20 may be referred to as dimpled dies and may be arranged to extend outwardly from a rear surface of the second plate 20 and away from the container 50 to which the second plate 20 is coupled.

Figure 5:
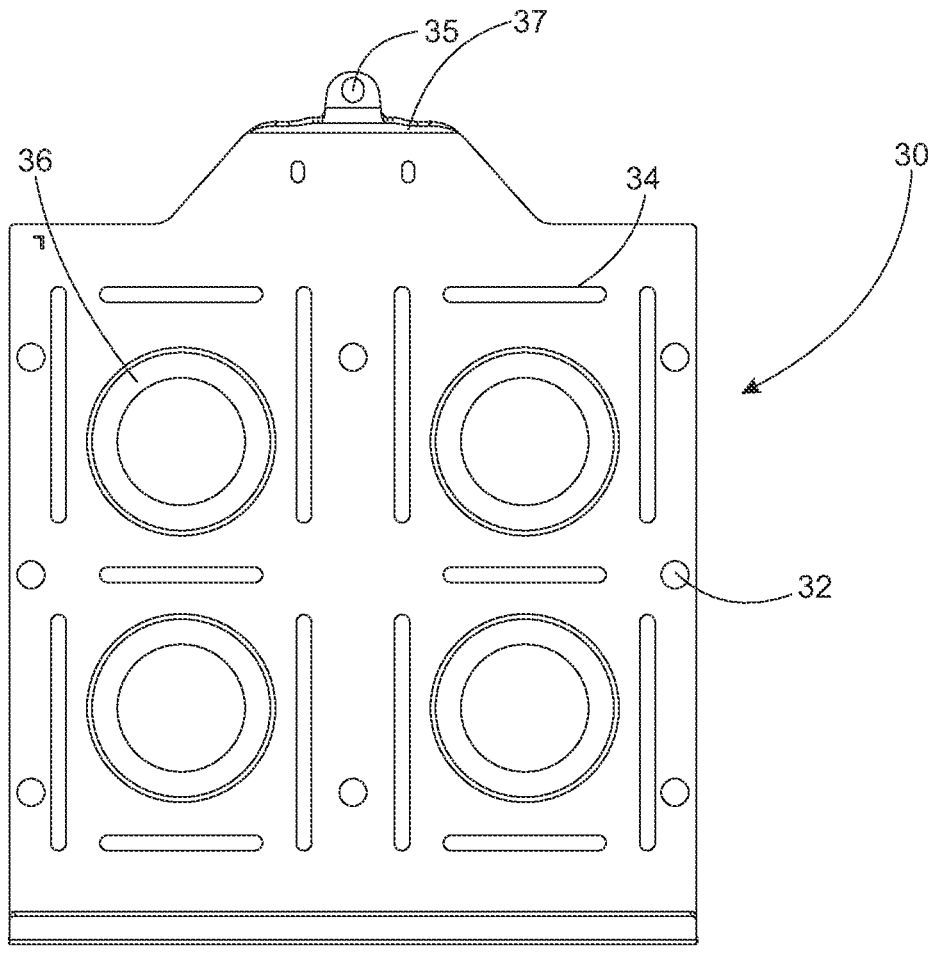
FIG. 5 shows is a plan view of a third plate in its pre-formed state of a quick release tool bag/case securing system according to an embodiment of the invention.
Figure 6A:
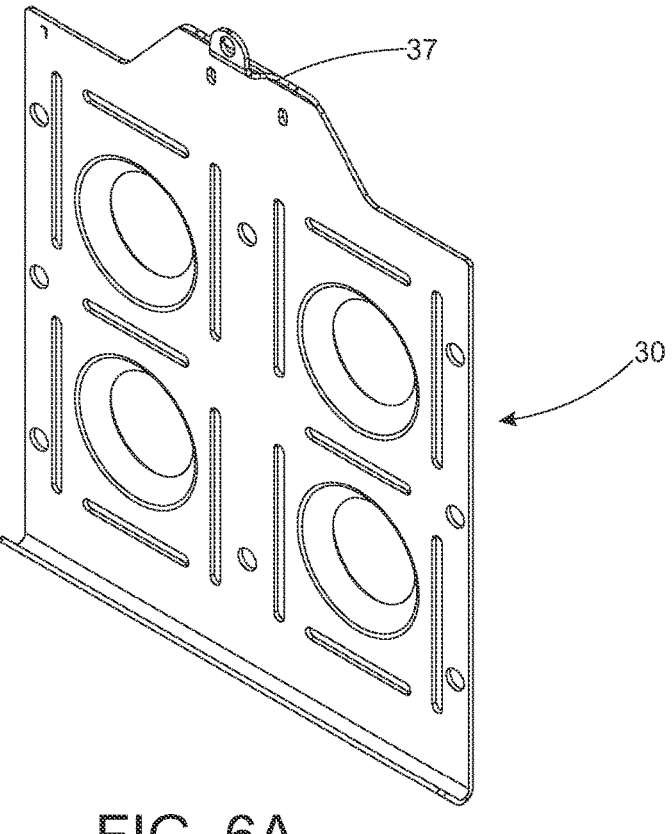
FIG. 6A shows a perspective view of a third plate in its formed state of a quick release tool bag/case securing system according to an embodiment of the invention.
Figure 6B:
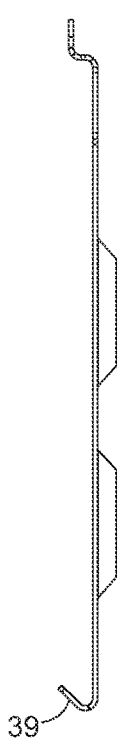
FIG. 6B shows a side view of a third plate in its formed state of a quick release tool bag/case securing system according to an embodiment of the invention.

FIGS. 5-6B depict the third plate 30 having a plurality of dimple dies or dimpled portions 36 that also operate as weight reducing holes 36, longitudinal slots 34 and apertures 32, all in a pattern. The apertures 32 are in a pattern to correspond with the hardware coupling the first plate 10 with the second plate 20 using apertures 12 and 22 respectively. The apertures 32 operate to allow portions of the hardware coupling the first plate 10 with the second plate 20 to extend within the apertures 32 allowing the second plate 20 to contact the third plate 30 when the second plate 20 is releasably coupled to the third plate 30. The plurality of dimpled portions 36 may be arranged to extend outwardly from a rear surface of third plate 30 towards a support structure (not shown) in a pattern. The pattern of the dimpled portions 26 on the second plate 20 corresponds to the pattern of the dimpled portions 36 on the third plate 30 to aid in alignment of the second plate 20 with the third plate 30 for releasably coupling the second plate 20 with the third plate 30. The dimpled portions 26 and 36 allow the plates to align in a manner that allows the quick release assembly 40 to operate to secure the second plate 20 to the third plate 30. For example, and without limitation, the dimpled portions 26 may engage the dimpled portion 36 of third plate 30 and move the second plate into proper alignment automatically based on the geometry of the dimpled portions 26 and 36, thereby providing an automatic alignment feature of the system 100. This automatic alignment operates to align all components of the system 100 so that second plate 20 contacts third plate 30.

Figure 12:
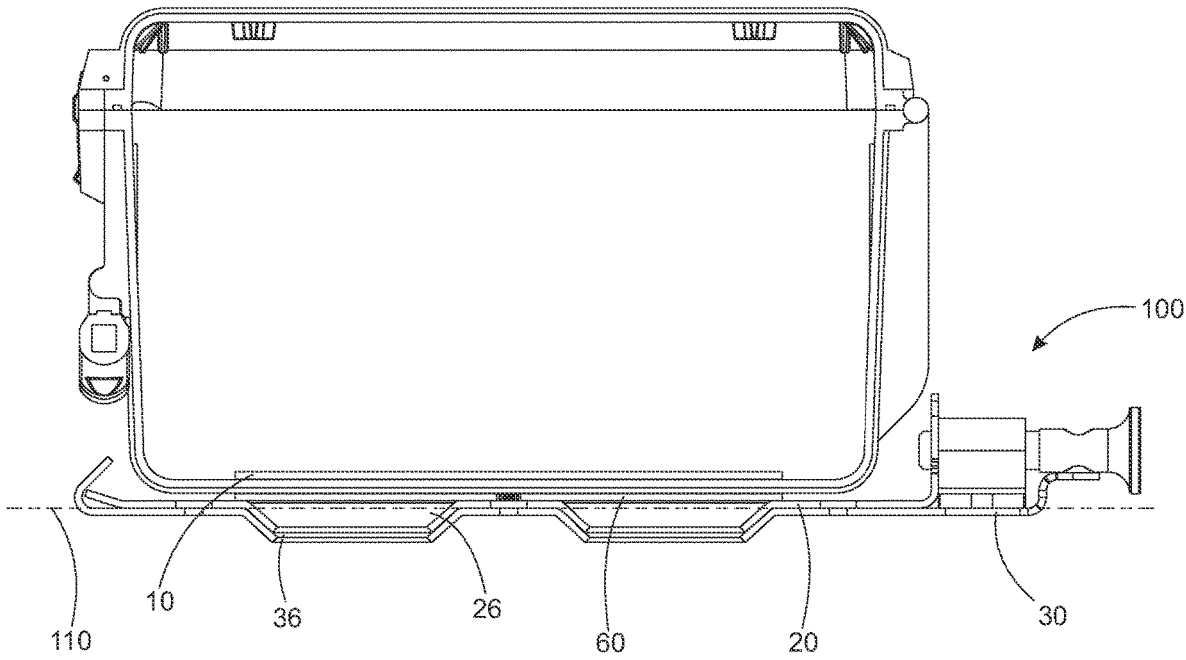
FIG. 12 shows a side section view of a quick release tool bag/case securing system assembled coupled to a container with the second plate secured to the third plate according to an embodiment of the invention.

Further, as shown in FIG. 12, the dimpled portions 26 of second plate 20 extend into dimpled portions 36 of third plate 30 and provide a benefit beyond alignment, wherein the dimpled portions 26 extending into and engaging with dimpled portions 36 inhibit the second plate 20 to move in any direction in a plane parallel to the second plate 20 and the third plate 30, such as plane 110 depicted as a broken line in FIG. 12. In at least this way the dimpled portions 26 and dimpled portion 36 operate to inhibit movement of the second plate 20 with respect to the third plate 30 during operation of the vehicle they are coupled to. Further, the plurality of longitudinal slots 24 and 34 arranged in a pattern on both second plate 20 and third plate 30 enable third plate 30 to be selectively mounted to a support structure with hardware engaging the longitudinal slots 34 and allow the hardware that secures the third plate 30 to the support structure to extend within the longitudinal slots 24 of the second plate 20 to allow the second plate 20 to contact the third plate 30 to be releasably coupled together.

A laterally extending tab flange portion 37 and J-shaped flange portion 39 extending along an edge portion thereof are also shown in FIGS. 6A-6B. Bent flange portion 28 of second plate 20 is received within J-shaped flange portion 39 of third plate 30 (see FIG. 11A). Second plate 20 and third plate 30 are releasably secured together (see FIGS. 11B and 11C). Third plate 30 fixedly couples to a support structure (not shown).

Figures 7A, 7B, 7C:
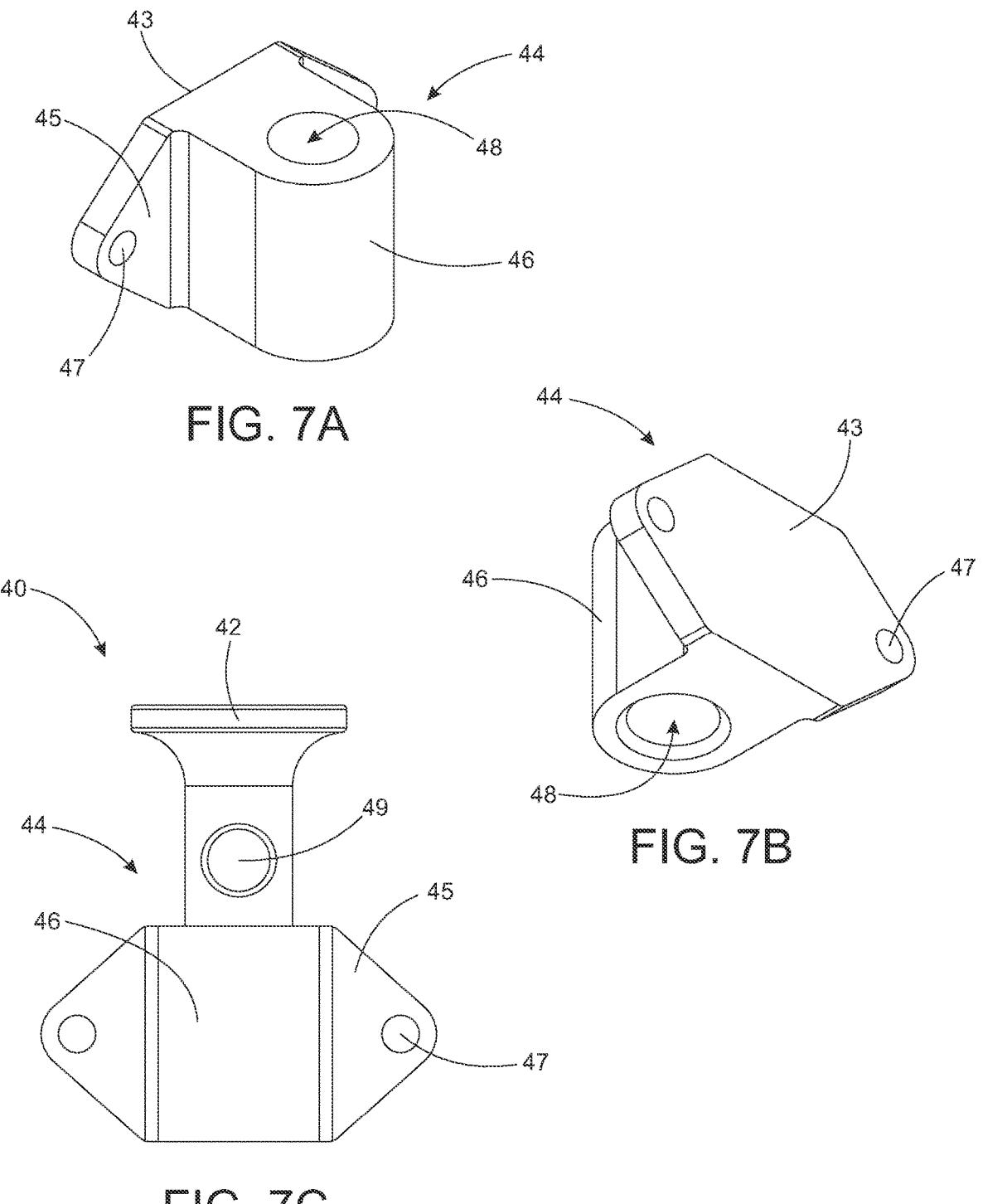
FIG. 7A shows a first perspective view of a quick release assembly according to an embodiment of the invention.
FIG. 7B shows a second perspective view of a quick release assembly according to an embodiment of the invention.
FIG. 7C shows a side view of a quick release assembly according to an embodiment of the invention.

FIGS. 7A-7C show quick release assembly 40 having a biased pin member 42 and a pin block 44, wherein the pin block 44 may be releasably mounted to the third plate 30. The biased pin member 42 may be slideably coupled to the pin block 44 with the biased pin member 42 slidable with respect to the pin block 44 and selectively engageable with second plate 20 in order to releasably secure second plate 20 and third plate 30 together. Tab flange portion 29 of second plate 20 may have an aperture to receive biased pin member 42 coupled to third plate 30 with pin block 44. Pin block 44 may include a base 43 having flange members 45 and apertures 47 extend through flange members 45. A pin body member 46 extends from the base 43 with a flange member 45 extending from the base 43 on each side of the pin body member 46. A pin aperture 48 extends through the pin body member 46. The apertures 47 operate to receive a coupling member, such as a bolt, through each aperture 47 in order to releasably couple the pin block 44 to another component or substrate, such as, but not limited to, third plate 30 as shown in embodiments of this invention. The biased pin member 42 may include a non-moveable component that is coupled within the pin aperture 48 of the pin body member 46. In some embodiments, this may be accomplished by use of threads within the pin aperture 48. This allows a non-moveable component of the biased pin member 42 to be coupled to the pin aperture 48 and retain the non-moveable component in a fixed location when coupled to the pin block 44. A moveable component that includes the biased pin member 42 may then utilize a spring to biased the pin member 42 away from the pin block 44 and require force to slide the pin member 42 toward the pin block 44. Additionally, the biased pin member 42 may include a lock aperture 49 that corresponds with a lock aperture 35 located in extending tab flange portion 37 of third plate 30, wherein a lock may be inserted through the lock aperture 49 of the pin member 42 and the lock aperture 35 located in extending tab flange portion 37 of third plate 30 to prevent the pin member 42 from moving. This locks the second plate 20 with the third plate 30 and prevents others from removing the container 50 or further prevent accidental dislodging of the case from the third plate 30 during operation of the vehicle.

Another embodiment of the quick release assembly 40 may comprise a method of using a quick release assembly 40. The method may include removing a pin block 44 of a quick release assembly 40 from a first component or first substrate, wherein the quick release assembly 40 operated to secure an item to the first component or the first substrate; couple the pin block 44 to a second component or a second substrate; and releasably secure an item to the second component or the second substrate by operating the quick release assembly.

Figure 8:
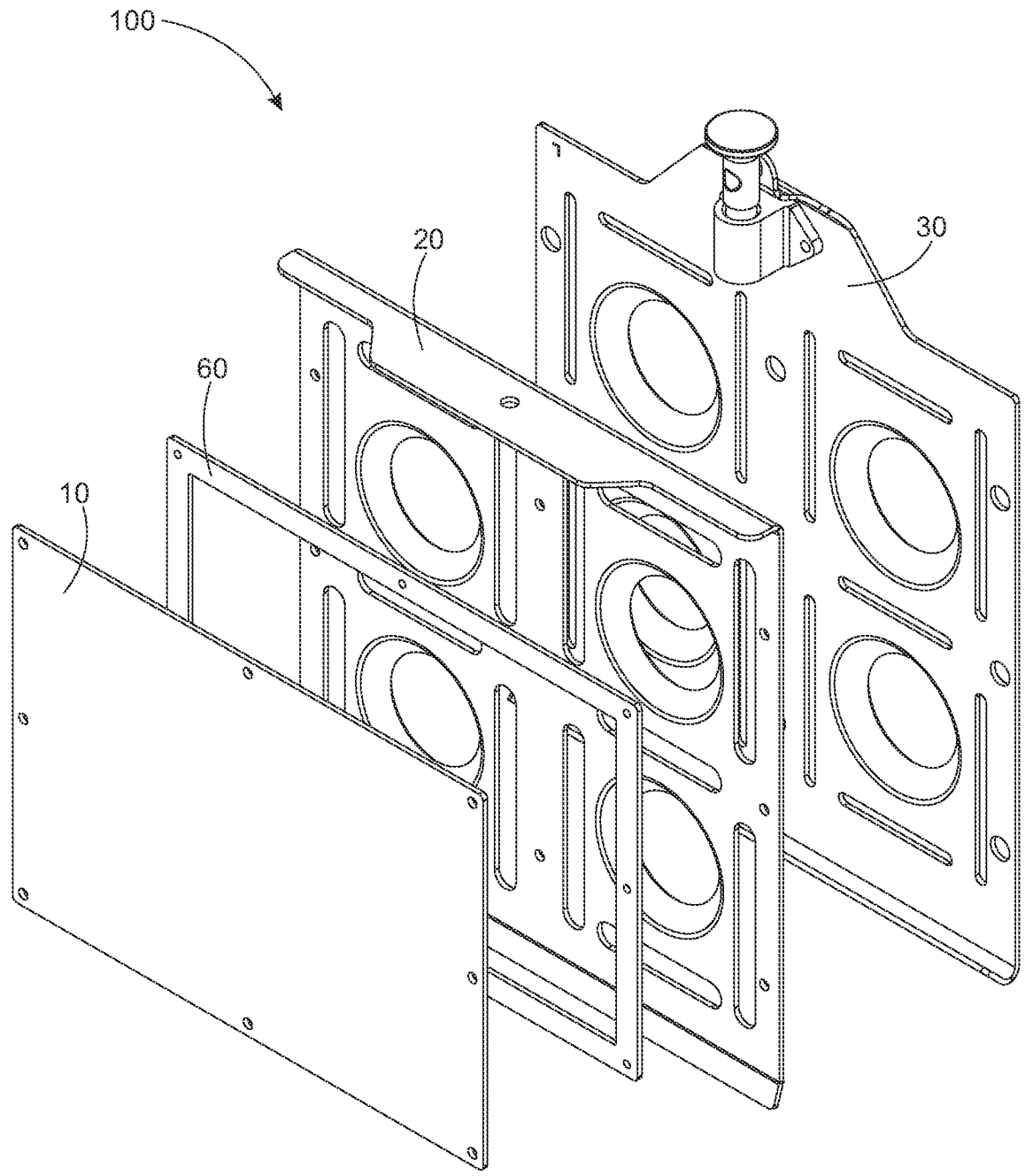
FIG. 8 shows an exploded view of the plates and a gasket of a quick release tool bag/case securing system according to an embodiment of the invention.
Figure 9:
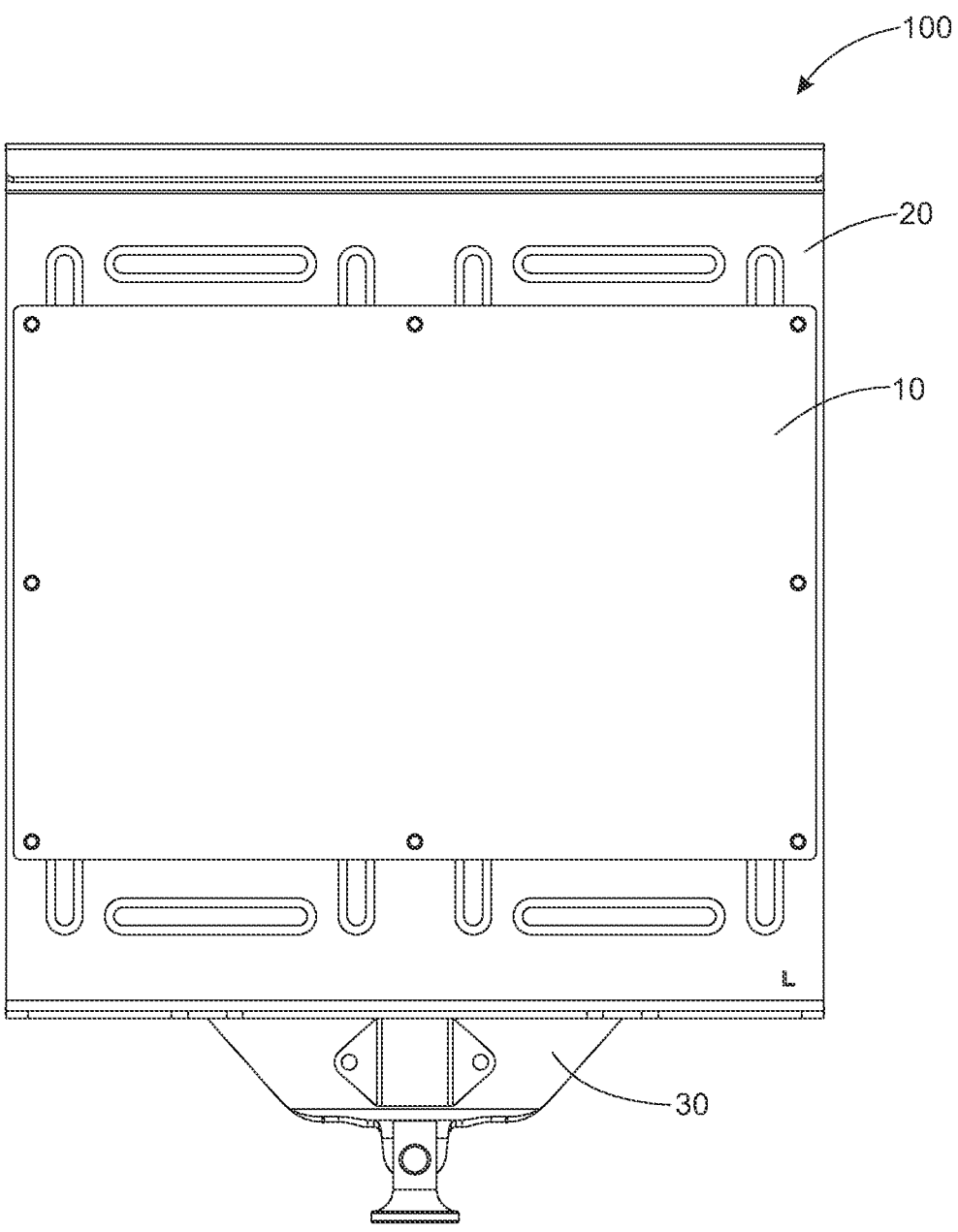
FIG. 9 shows a plan view of a quick release tool bag/case securing system assembled without a container according to an embodiment of the invention.
Figure 10:
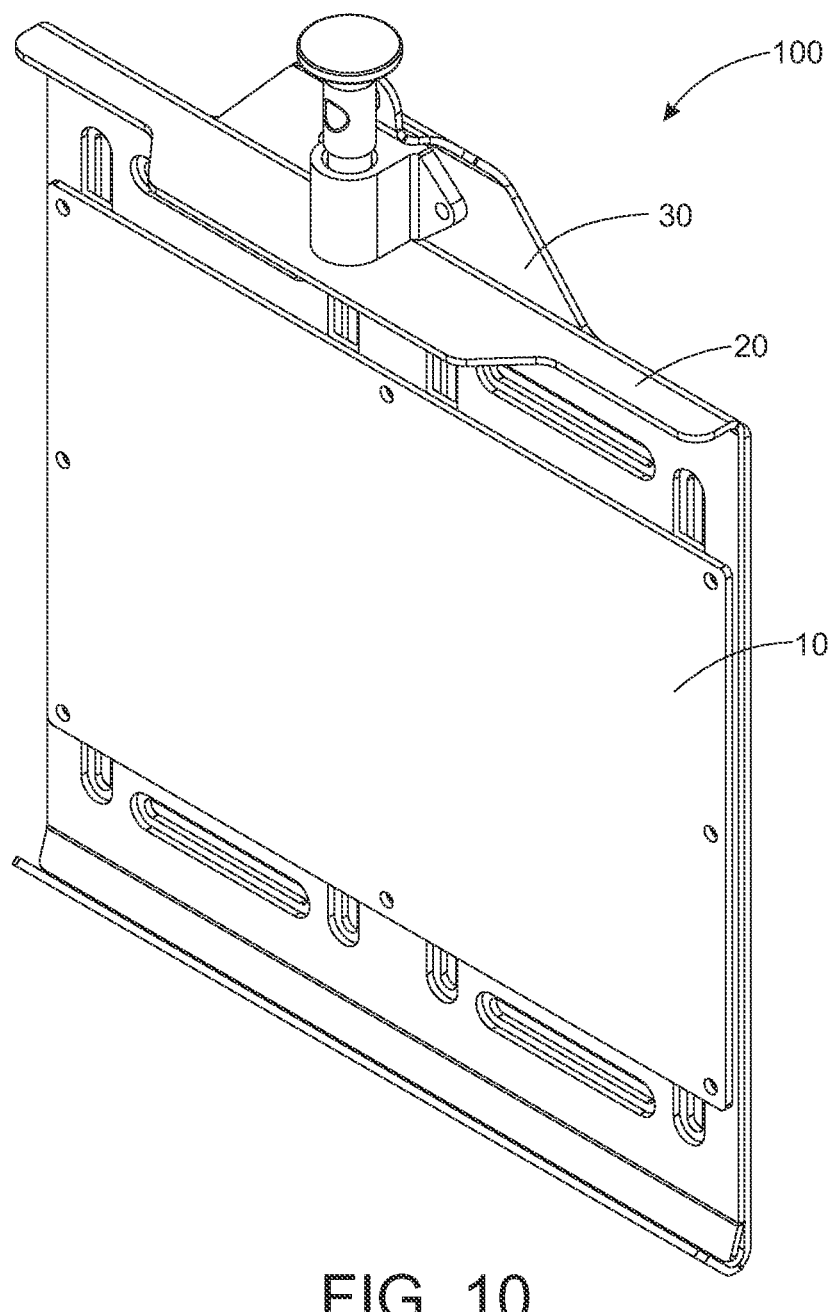
FIG. 10 shows a perspective view of a quick release tool bag/case securing system assembled without a container according to an embodiment of the invention.
Figure 11A:
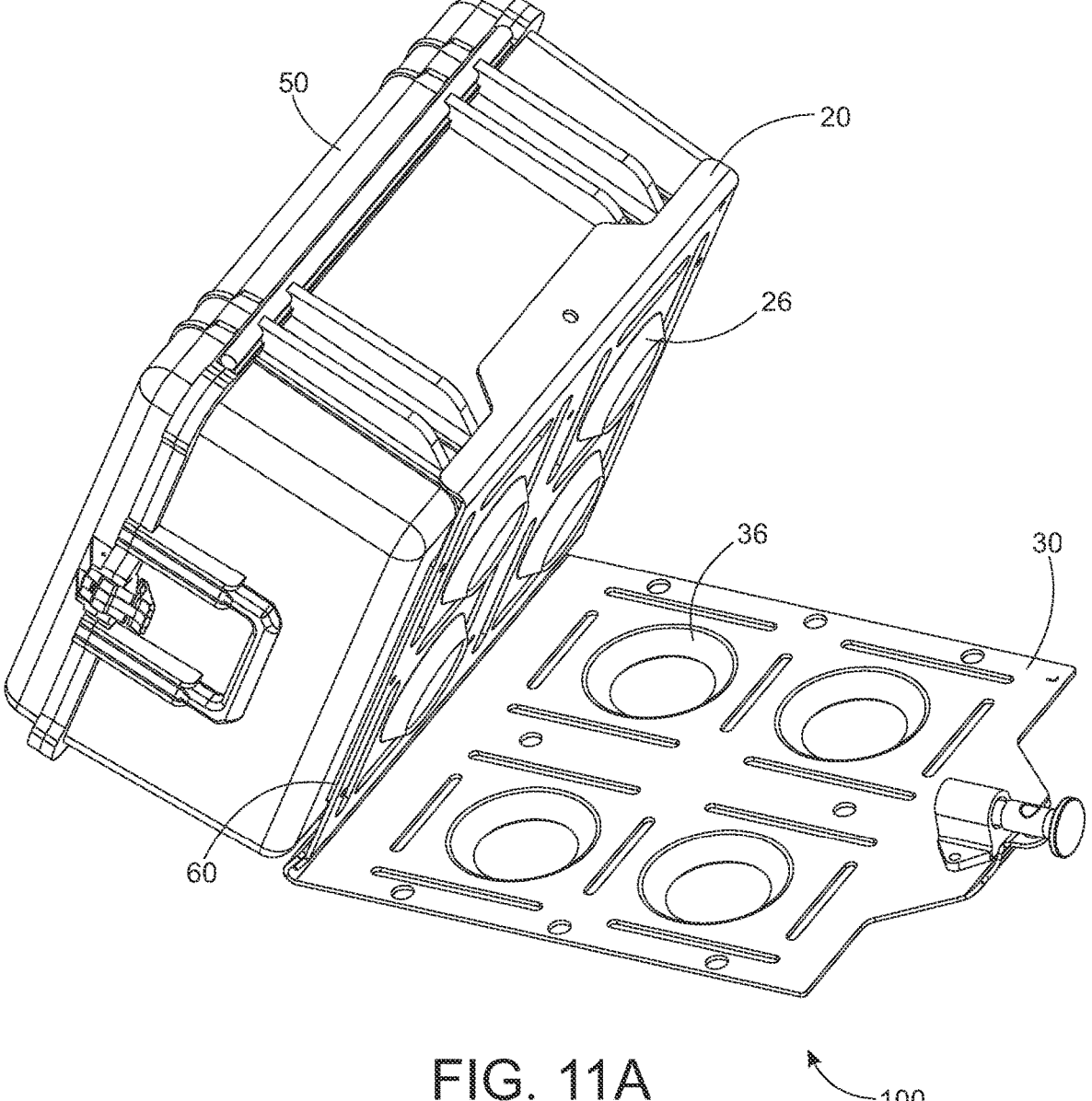
FIG. 11A shows a perspective view of a quick release tool bag/case securing system assembled coupled to a container in the process of securing the second plate to the third plate according to an embodiment of the invention.
Figure 11B:
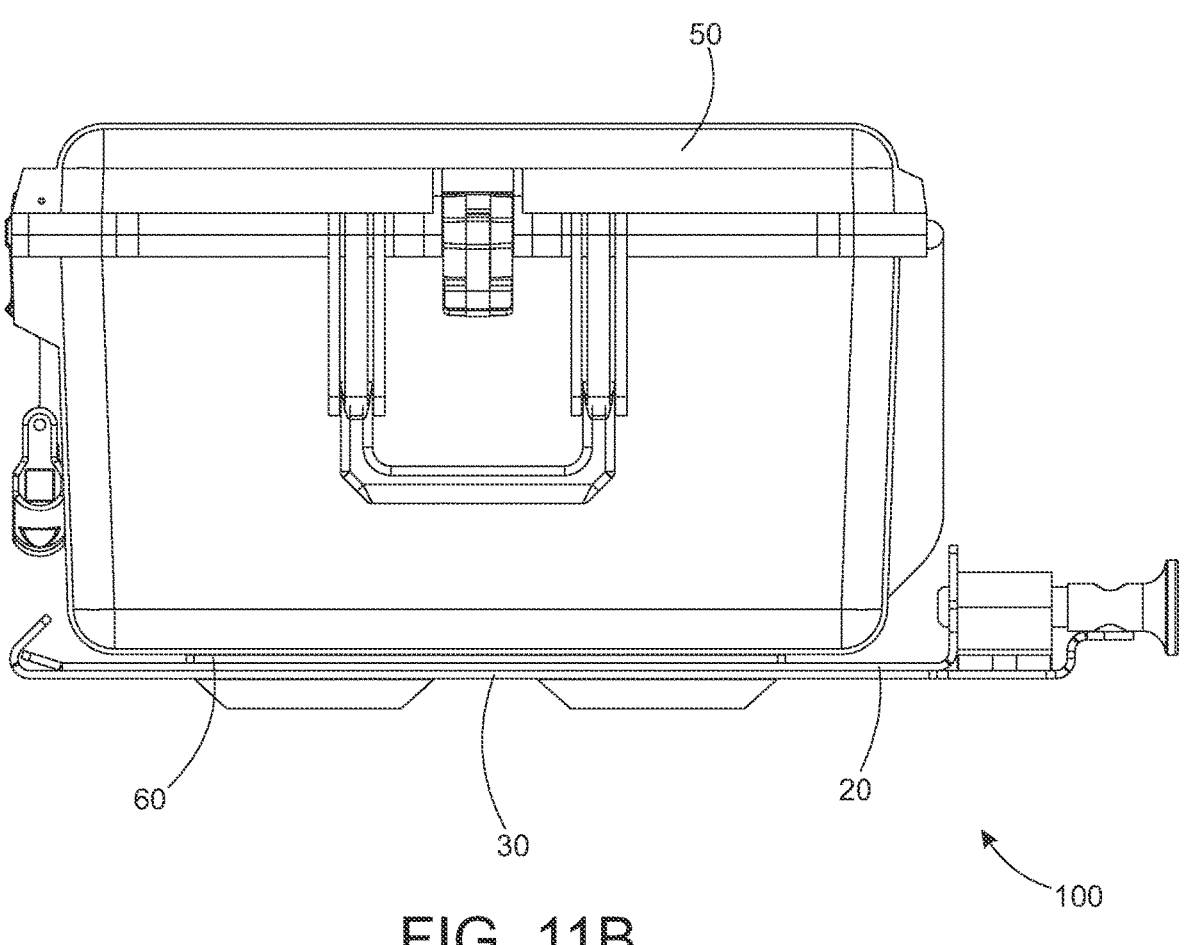
FIG. 11B shows a side view of a quick release tool bag/case securing system assembled coupled to a container with the second plate secured to the third plate according to an embodiment of the invention.
Figure 11C:
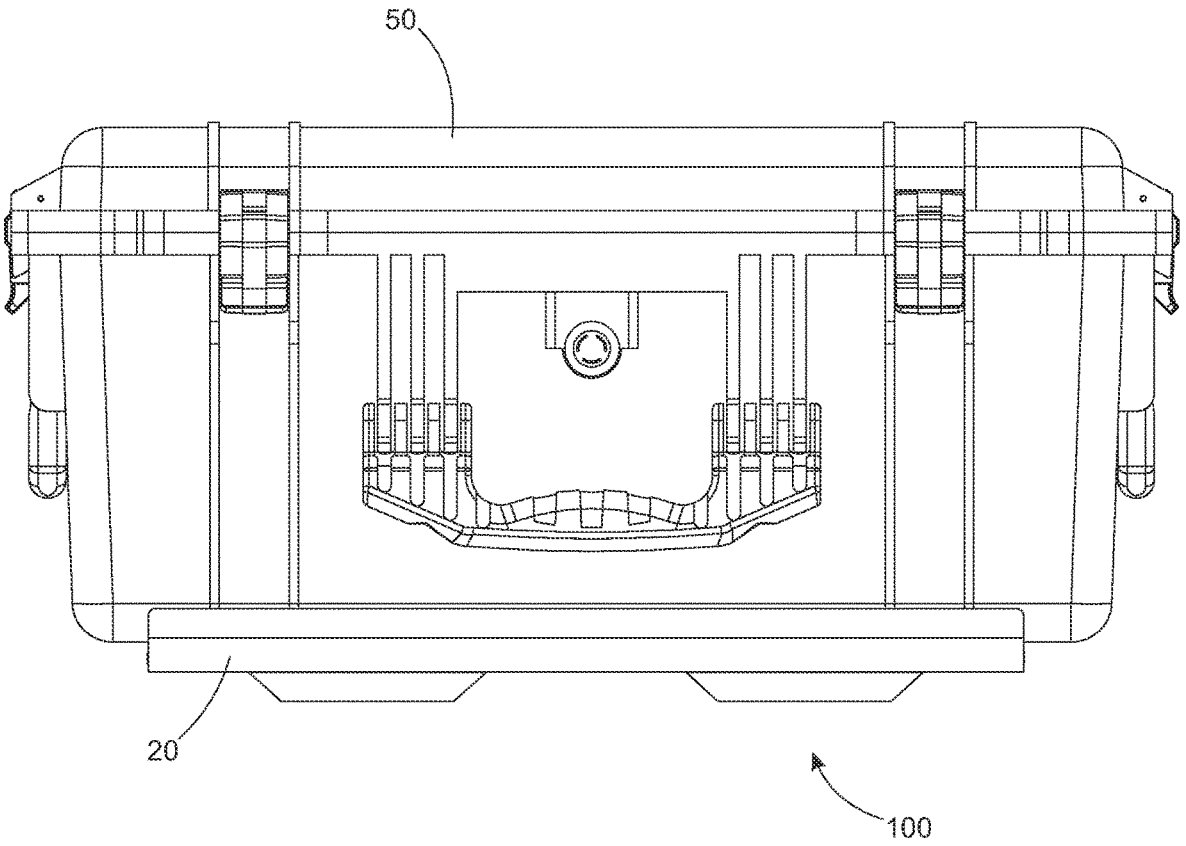
FIG. 11C shows an end view of a quick release tool bag/case securing system assembled coupled to a container with the second plate secured to the third plate according to an embodiment of the invention.

For better understanding of the respective locations of the first plate 10, second plate 20 and third plate 30, FIGS. 8-10 depict the location of each of the plates with respect to one another. Further, is shows that a gasket 60 may optionally be used to act as a seal. In embodiments, as shown in FIGS. 11A-12, holes may be formed, such as by drilling, punching or the like, in a surface of the container 50. This is done to receive hardware therethrough to secure the first plate 10 in an interior of the case 50 to the second plate 20 on the exterior of the case 50. The gasket 60 may be located between the second plate 20 and the exterior surface of the container 50 as shown in FIGS. 11A-12. The gasket 60 may operate as an additionally seal to inhibit things like water and dust from entering the interior of the container 50 through the holes formed in the container 50 to attach the system 10 to the case. Optionally, and not shown, the gasket 60 may be located between the first plate 10 and the interior surface of the container 50.

In some embodiments, the support structures may include off-road vehicles, such as, but not limited to, utility-terrain vehicles (UTVs), all-terrain vehicles (ATVs), snow mobiles, water vessels and the like.

In some embodiments, the container 50 may include, but are not limited to, both flexible containers, such as tool kits, tool bags, first aid kits, coolers, and rigid containers, such as rigid tool cases, coolers, and the like.

In some embodiments, first plate 10, second plate 20 and third plate 30 may be substantially the same in size and may be made of a rigid sheet material. First plate 10 may comprise a logo and/or indicia.

In some embodiments the components defining any quick release securing system for a container may be formed of any of many different types of materials or combinations thereof that can readily be formed into shaped objects provided that the components selected are consistent with the intended operation of a quick release securing system for a container accessory rack 10. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Another embodiment may include a method for selectively mounting a container to a support structure using a quick-release securing system 100. The method comprises providing a first plate received within an interior of the container to lie against an interior of a wall surface thereof; providing a second plate having a bent flange portion and secured to an exterior wall surface of the container, wherein the first plate and the second plate are secured together having the wall surface of the container therebetween; providing a third plate fixedly coupled to the support structure and having a J-shaped flange portion extending along an edge portion thereof, the bent flange portion of the second plate received within the J-shaped flange portion of the third plate, wherein the second and third plates are releasably coupled together; providing a quick release assembly having a biased pin member, slideably mounted on the third plate and selectively engageable with the second plate in order to releasably secure the second and third plates together; and selectively releasing the biased pin member, removing the second plate from the third plate.

The method may also comprise after removing the second plate from the third plate, repositioning the second plate against the third plate; and withdrawing the pin against its bias in order to receive the second plate against the third plate. Further, the step of releasably coupling the second plate with the third plate may further comprise automatically aligning the second plate with the plate in response to dimpled portions of the second plate engaging dimples portions of the third plate.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A quick release securing system for a container comprising:
   a second plate having a bent flange portion extending along an edge portion thereof and a tab flange portion extending along an opposite edge portion of the second plate, the tab flange portion having an aperture, the second plate configured to secure to an exterior surface of a container;
   a third plate having a J-shaped flange portion extending along an edge portion thereof, the bent flange portion of the second plate received within the J-shaped flange portion of the third plate, wherein the second and third plates are releasably coupled together; and
   a quick release assembly having a biased pin member provided on the third plate and selectively engageable with the aperture in the tab flange portion to releasably secure the second and third plates together.

2. The quick release securing system of claim 1, wherein the third plate is configured to couple to a support structure.

3. The quick release securing system of claim 1, wherein the third plate is provided with a plurality of dimpled portions arranged in a pattern on the third plate and extending outwardly from a rear surface of the third plate towards the support structure.

4. The quick release securing system of claim 3, wherein the second plate is provided with a plurality of dimpled portions arranged in a pattern on the second plate corresponding to the pattern of the dimpled portions arranged on the third plate, extending outwardly from a rear surface of the second plate.

5. The quick release securing system of claim 4, wherein the plurality of dimpled portions of the second plate engage with the plurality of dimpled portions of the third plate when the second plate is releasably coupled to the third plate.

6. A quick release securing system for a container comprising:
   a second plate having a bent flange portion extending along an edge portion thereof and a tab flange portion extending along an opposite edge portion of the second plate, the tab flange portion having an aperture, the second plate integral with an exterior surface of a container;
   a third plate having a J-shaped flange portion extending along an edge portion thereof, the bent flange portion of the second plate received within the J-shaped flange portion of the third plate, wherein the second and third plates are releasably coupled together; and
   a quick release assembly having a biased pin member provided on the third plate and selectively engageable with the aperture in the tab flange portion to releasably secure the second and third plates together.

* * * * *